United States Patent [19]

Laprade et al.

[11] 4,010,722

[45] Mar. 8, 1977

[54] METERING CONTROL FOR THE AIR-FUEL MIXTURE IN INTERNAL COMBUSTION ENGINES

[76] Inventors: Bernard R. Laprade; Xavier J. Laprade, both of 64260 Arudy; Pierre J. Gele, Route de Lourdes, 65000 Tarbes, all of France

[22] Filed: Dec. 15, 1975

[21] Appl. No.: 640,934

[30] Foreign Application Priority Data

Dec. 20, 1974   France ........................ 74.42191

[52] U.S. Cl. .................... 123/119 D; 123/119 EC; 123/124 R
[51] Int. Cl.² ............................... F02M 23/04
[58] Field of Search .... 123/119 E, 119 EC, 32 EA, 123/32 EE, 119 R, 119 D, 119 DB, 124 R, 124 B

[56] References Cited

UNITED STATES PATENTS

| | | | |
|---|---|---|---|
| 3,374,991 | 3/1968 | Walker | 123/119 D |
| 3,738,341 | 8/1976 | Loos | 123/119 E |
| 3,745,768 | 7/1973 | Zechnall et al. | 123/32 EA |
| 3,759,232 | 9/1973 | Wahl et al. | 123/32 EA |
| 3,827,237 | 8/1974 | Linder et al. | 123/32 EA |
| 3,841,283 | 10/1974 | Wood | 123/119 E |
| 3,900,014 | 8/1975 | Bundesen | 123/119 EC |
| 3,906,910 | 9/1975 | Szlaga, Jr. | 123/119 E |
| 3,977,375 | 8/1976 | Laprade et al. | 123/119 D |

*Primary Examiner*—Wendell E. Burns
*Attorney, Agent, or Firm*—Finnegan, Henderson, Farabow & Garrett

[57] ABSTRACT

A fuel injection control system for an internal combustion engine comprises at least one auxiliary air supply branched at the engine intake pipe downstream of the air-fuel metering system, and at least one valve controlling the auxiliary air supply. The valve is controlled by a diaphragm with a return-spring membrane subjected to a partial vacuum from any suitable source which is modulated on one hand by at least one variable throttle or choke responsive to the air flow in the metering system and, on the other hand, by an electronic valve controlled by a probe responsive to the composition of burnt gases in the exhaust manifold.

16 Claims, 7 Drawing Figures

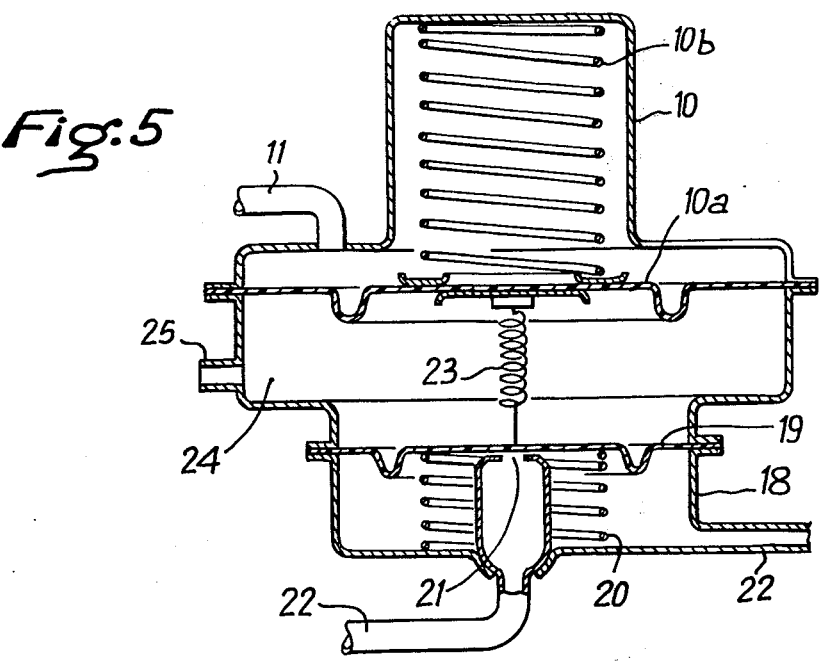
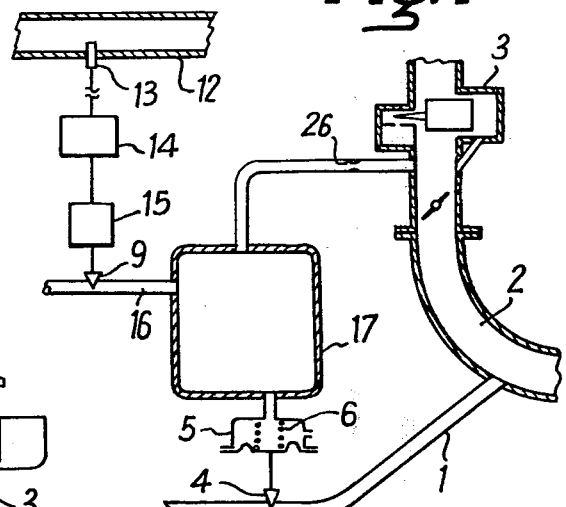
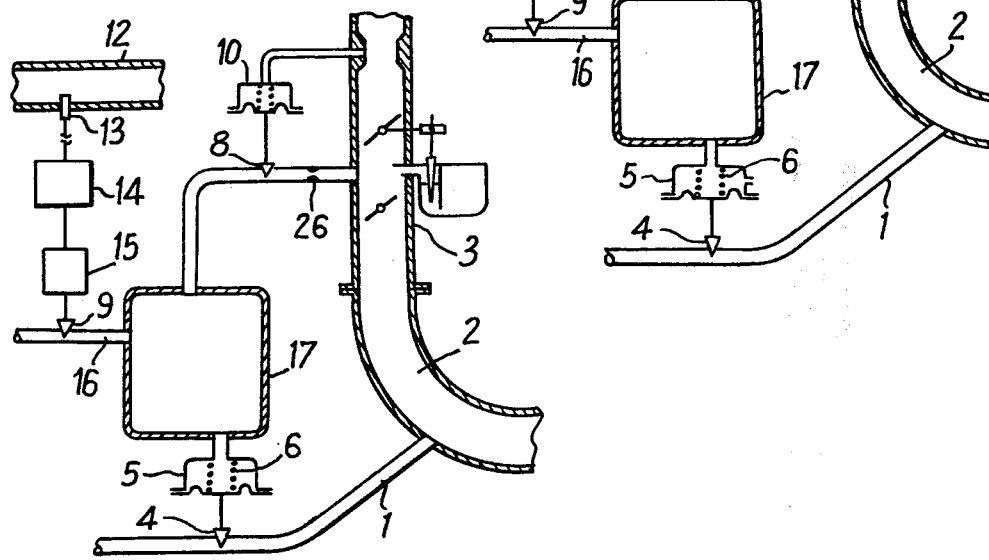

METERING CONTROL FOR THE AIR-FUEL MIXTURE IN INTERNAL COMBUSTION ENGINES

It is known how to correct the air-fuel mixture metering in internal combustion engines by means of data from a probe located in the exhaust and delivering a current which is a function of the contents of certain gases, in particular oxygen and carbon oxides, in the exhaust gases.

It is also known how to operate this control by actuating an auxiliary air supply issuing in the intake pipe downstream of the metering system (e.g., a carburetor or other device).

Co-pending U.S. application Ser. No. 482,884, filed June 25, 1974, in the name of the same applicants, describes an apparatus of the above type in which the supply of auxiliary air is controlled by a valve actuated by the partial vacuum existing in the metering system, the partial vacuum being modulated by an electromagnetic valve as a function of the data from the probe, and wherein the modulation acts on the escape vent of a buffer reservoir subjected to the partial vacuum in the metering system.

It was found, however, that when the throttle is closed, the partial vacuum in the carburetor is insufficient to perform its control function for the secondary air valve and that it will become sufficient only at a non-negligible engine speed.

The object of the present invention is to remedy this drawback.

The fuel injection control which is the object of the invention comprises at least one auxiliary air supply branched at the engine intake pipe downstream of the air-fuel system, and at least one valve controlling the auxiliary air supply or supplies. The valve is controlled by a diaphragm with a return-spring membrane or equivalent, subjected to a partial vacuum from any suitable source providing a constant partial vacuum of predetermined value and modulated on one hand by at least one variable throttle or choke providing data proportional to to the air flow in the metering system by any suitable means, and on the other hand by the intermediary of an electromagnetic valve as a function of the data from a probe in the exhaust manifold capable of supplying an electric current varying with the composition of the burnt gases.

The invention also applied to the following arrangements:

a. the air flow data is provided by a second membrane capsule with return spring subjected to the partial vacuum in the neck of a venturi tube located in the intake pipe, the venturi tube possibly being inside the air-fuel mix metering system;

b. the constant partial vacuum controlling the valve is that in the intake manifold and regulated to a predetermined constant value, which preferably shall be adjustable, by any suitable means;

c. the regulation of the partial vacuum supplied by the intake manifold is obtained by a variable orifice controlled by a third membrane capsule with return spring or equivalent;

d. the constant partial vacuum controlling the valve is that in the body of a constant partial vacuum carburetor;

e. the constant partial vacuum controlling the valve is that in a constant partial vacuum carburetor and with an adjustable venturi tube;

f. the partial vacuum supplied by the constant partial vacuum source is set to any suitable value by means of a calibration device or equivalent;

g. the modulation as function of probe data comprises a buffer reservoir provided with an escape vent on which is located the electromagnetic valve subjected to the probe;

h. the reservoir is subjected to the partial vacuum from the constant partial vacuum source;

i. the reservoir is subjected to the partial vacuum in the carburetor body;

j. the dimensions of the circuits and calibrations are such that the partial vacuum applied to the buffer reservoir will remain between approximately 0 and 73.5 mm-Hg, k. the second and third membrane capsules are joined in a capsule with two (2) membranes connected by an elastic return means.

The term membrane capsule or equivalent includes any device converting the variations in partial vacuum into displacement, for instance a floating piston, whether spring-biased or not.

The invention is illustrated by the accompanying drawing, wherein:

FIG. 5 illustrates in detail the two-membrane capsule of FIGS. 3 and 4;

FIG. 6 illustrates a variation in which the metering system is a carburetor with constant partial vacuum; and FIG. 7 is a variation of the embodiment of FIG. 6 for the case of a carburetor with constant partial vacuum and with variable venturi tube.

Figure 1:
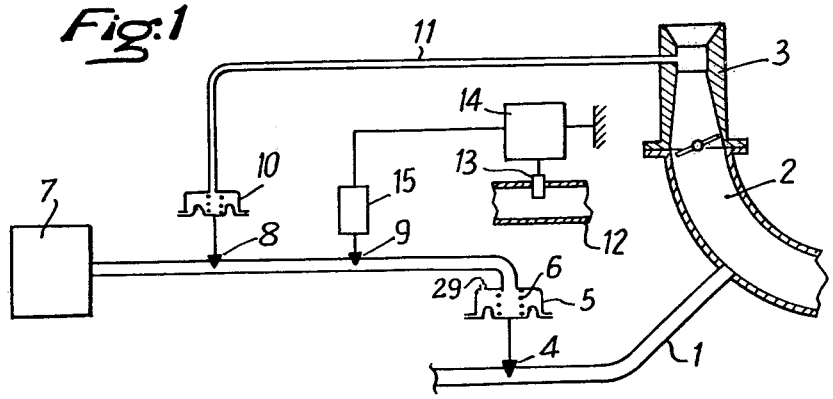
FIG. 1 is a schematic view illustrating the principle of the invention.

Referring to FIG. 1, an apparatus constructed according to the invention comprises an auxiliary air supply 1 issuing into an intake pipe 2 downstream of a carburetor 3 and controlled by a valve 4.

Valve 4 is controlled by a membrane capsule 5 with an elastic return spring 6 and subjected to a partial vacuum, which is constant in value, from a source 7. Preferably the magnitude of this partial vacuum is made adjustable by any suitable means.

The partial vacuum from source 7 is modulated by throttles 8 and 9. Throttle 8 varies as a function of the partial vacuum in the body of device 3 by the intermediary of a second membrane capsule 10 and a channel 11. Throttle 9 varies as a function of the composition of the burnt gases passing through an exhaust pipe 12 by the intermediary of a probe 13, electronic circuit 14 and electromagnetic valve 15.

The apparatus operates as follows:

Source 7 provides a constant partial vacuum of suitable level in order to supply the energy required to control valve 4, for instance from 7.35 and 36.75 mm-Hg.

This partial vacuum is modulated as a function of the data from probe 13 by electromagnetic valve 9 and hence, secondary air supply 1 responds to the data from probe 13. Furthermore, this partial vacuum also is modulated as a function of the partial vacuum in system 3 (carburetor or equivalent) by valve 8.

In this manner one obtains the advantages of applicants' co-pending U.S. application Ser. No. 482,884 (air supply being a function both of the partial vacuum in the carburetor and of the probe data) while the energy magnitude required to control valve 8 is constantly available.

Figure 2:
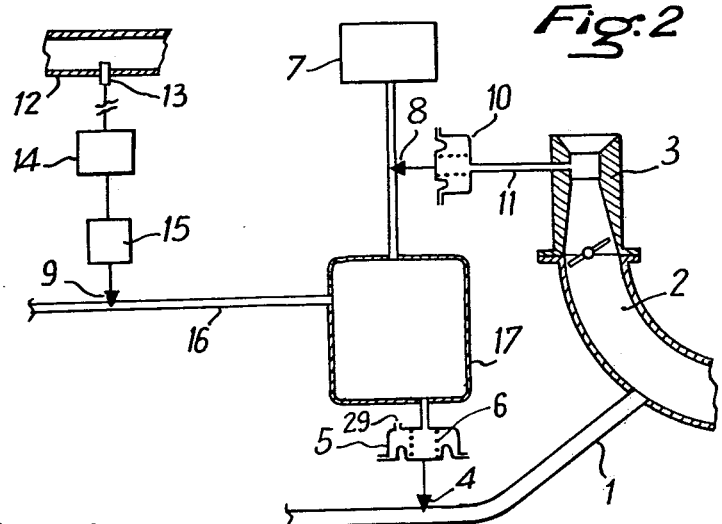
FIG. 2 is a variation in which the electromagnetic valve acts on the escape vent of the buffer reservoir.

As regards the example of FIG. 2, modulation of constant partial vacuum source 7 as a function of the probe data is obtained by disposing electromagnetic valve 15 in an escape vent 16 of a buffer reservoir 17 interposed between source 7 and capsule 5. The electromagnetic valve actuates the scope vent of the buffer reservoir in conformity with co-pending U.S. application Ser. No. 482,884.

Figure 3:
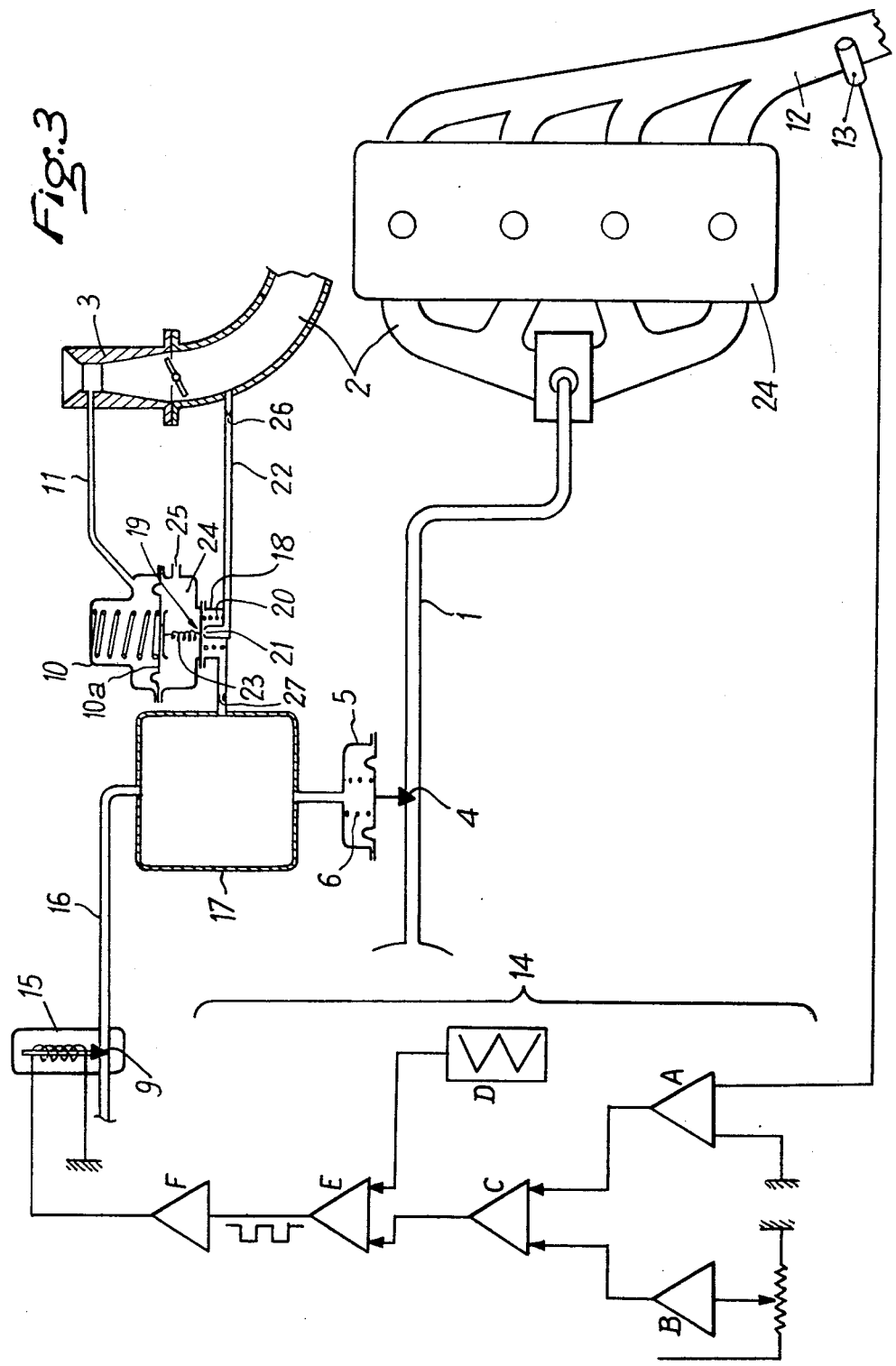
FIG. 3 illustrates a variation in which the motive partial vacuum source is provided by the manifold.

The example of FIG. 3 is the preferred embodiment of the invention. In this example, the partial vacuum is that of manifold 2 converted into one of constant value predetermined by a third membrane capsule 18 of which a membrane 19, which is spring-biased by a spring 20, forms a flap for closing an orifice 21 of a channel 22 connecting intake manifold 2 to buffer reservoir 17.

Third membrane capsule 18 is consolidated into a single device with the second capsule 10. Thus, variable choke 8 (FIGS. 1 and 2) is made integral with orifice 21 which varies through membrane flap 19.

A membrane 10a is elastically biased by a spring 10b in capsule 10. Membrane flap 19 is connected to membrane 10a by a spring 23 located in a space 24 communicating by an opening 25 with the atmosphere.

This double capsule is shown in detail in FIG. 5.

Electromagnetic valve 15, actuating valve 9 in excape vent 16 of buffer reservoir 17, is controlled by probe 13 in exhaust 12 of engine 25 through an electronic circuit 14, preferably in conformity with applicant's co-pending U.S. application Ser. No. 482,884.

For the sake of schematic clarity, manifold 2 is shown twice. Operation is as follows: through the intermediary of pressure regulator 18-21, the partial vacuum in the manifold is used to obtain a constant partial vacuum at reservoir 17. This partial vacuum may be on the order of 7.35 mm-Hg (ranging from 0 to 36.75 mm-Hg) will be constant regardless of the level in the manifold if the ratio of the surface of orifice 21 to the surface of membrane 19 is sufficiently small. A calibrated orifice 26 achieves a first reduction in the manifold partial vacuum, which may be as high as 367.5 mm-Hg.

The partial vacuum so regulated by the intermediary of reservoir 17 is transmitted to control valve 4.

When the engine speed increases, the partial vacuum at carburetor 3 rises and is transmitted without loss to membrane 10a, so that through the intermediary of spring 23, the adjustment of pressure regulator 18 will be modified, whereby the partial vacuum at the output of the regulator will increase and hence also the lift of valve 4.

The electronic control consisting of probe 13, circuit 14 and electromagnetic valve 15 modulates the partial vacuum in reservoir 17 as a function of the signal from exhaust probe 13. The minimum partial vacuum of the regulator may be approximately 7.35 mm-Hg and the maximum, for the maximum partial vacuum in the carburetor, may be approximately 36.75 mm-Hg. These magnitudes are, however, exemplary and must be adapted to each particular case.

In order to prevent any reverberation from the action of electromagnetic valve 15 on regulator 18-21, a calibration orifice 27 may advantageously be placed in channel 22.

By adjustment of either or both of springs 20 and 23, it is possible to obtain proportional relations of different slopes. Further, by modifying orifice 21 of the regulator, non-linear relationships may be achieved, for instance by using a needle orifice.

As regards the example of FIG. 3, reservoir 17 is subjected to the partial vacuum from manifold 2 which is regulated by flap valve 18 through orifice 21.

Figure 4:
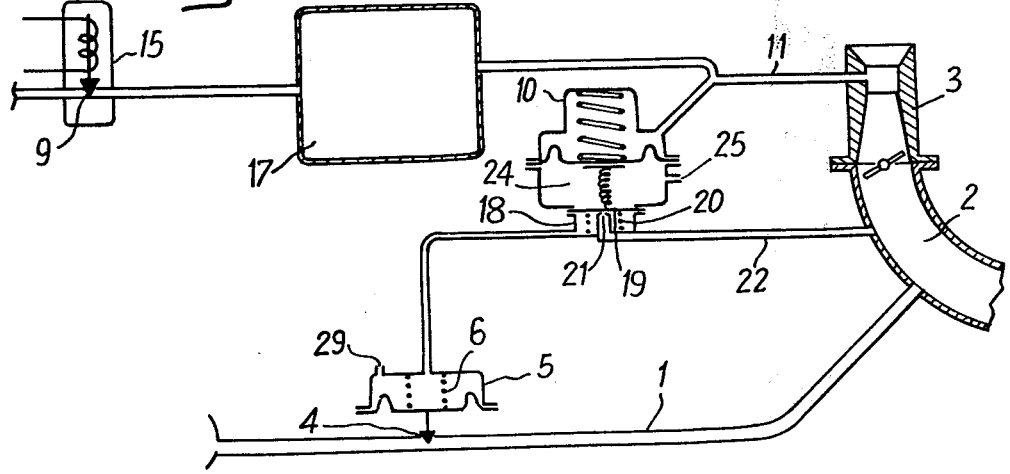
FIG. 4 is a variation of the embodiment of FIG. 3.

In the example of FIG. 4, reservoir 17 is subjected to the partial pressure in the body of carburetor 3. The two modulations provided on one hand by electromagnetic valve 15 and on the other by second capsule 10 are combined to act on a single variable orifice 21 in conduit 22 connecting manifold 2 to first capsule 5. Preferably, the balance of the arrangement will conform to that of FIG. 3.

As regards FIG. 6, the air-gasoline metering device 3 is a carburetor with constant partial vacuum.

This partial vacuum is applied as a constant one to control valve 4 and is modulated as in FIG. 2 on one hand as a function of the air-flow rate by the intermediary of capsule 10 subjected to the partial vacuum in a venturi tube in the intake pipe, capsule 10 controlling variable choke 8, and on the other hand by electromagnetic valve 15 controlling variable choke 9 in escape vent 16 of reservoir 17 and subjected to the data from probe 13.

Calibrated orifice 26 reduces the constant partial vacuum of carburetor 3 to any desired value.

As regards FIG. 7, the metering device is a carburetor with constant partial vacuum of the variable venturi tube type. The partial vacuum in such carburetor is not strictly constant but is itself modulated as a function of the air-flow rate. In this case capsule 10 may be eliminated. Calibrated orifice 26 provides capsule 5 with a regulated partial vacuum modulated to a sufficient degree for controlling valve 4.

The secondary arrangements from applicants' co-pending U.S. application Ser. No. 482,884 are advantageously combined with those described above, in particular: (1) introducing in the secondary air supply an adjustable air loss with increases as the partial vacuum in the intake manifold is increased; and (2) providing means to render the entire regulation system inoperative by closing valve 4 for slow motion and full engine load.

The arrangements of the invention may be combined with metering apparatus 3 to form an integral regulated metering or fuel injection system and the system aims directly at such an arrangement.

Different arrangements within the grasp of the expert may be added or incorporated in those of the invention. A discharge cover 29 (FIG. 1) may be provided in control capsule 5 of valve 4. This cover will be required when there is no buffer reservoir 17 with escape vent 16 so that closing of the communication between source 7 and capsule 5 will result in closing of valve 4. When reservoir 17 is provided, such cover is not absolutely required because the command to close the secondary air supply coincides with that for opening electromagnetic valve 9, 15 which connects capsule 5 to the atmosphere via the escape vent 16.

What is claimed is:

1. A metering-correction control apparatus for the air-fuel mixture in an internal combustion engine including an intake pipe, a device for metering the air-fuel mixture, and an exhaust manifold, said control apparatus comprising:

at least one auxiliary air supply branched at the engine intake pipe downstream of the metering device;

at least one valve for controlling the introduction of secondary air in said auxiliary air supply;

a spring-biased membrane capsule for controlling said valve;

a source coupled to said capsule for supplying a constant partial vacuum of predetermined magnitude; and variable throttle means for modulating the partial vacuum applied to said capsule, said throttle means including first control means responsive to the rate of air-flow in the metering device of the air-fuel mixture to control the partial vacuum proportionally to said air-flow rate and second control means responsive to the composition of burnt gases in the exhaust manifold to control the partial vacuum as a function of the composition of the burnt gases.

2. Apparatus as defined in claim 1, wherein said first control means comprises a second spring-biased membrane capsule subjected to the partial vacuum in the neck of a venturi tube in the intake pipe.

3. Apparatus as defined in claim 1, wherein the constant partial vacuum source for controlling the valve comprises means responsive to the partial vacuum in the intake manifold for regulating the partial vacuum to a predetermined constant value.

4. Apparatus as defined in claim 3, wherein said regulating means for the partial vacuum from the intake manifold comprises a third spring-biased membrane capsule provided with a variable orifice.

5. Apparatus as defined in claim 1, wherein said constant partial vacuum source for controlling the valve comprises a constant partial vacuum carburetor.

6. Apparatus as defined in claim 1, wherein said constant partial vacuum source for controlling the valve comprises a constant partial vacuum carburetor provided with an adjustable venturi tube.

7. Apparatus as defined in claim 1, which includes calibration means for controlling the partial vacuum provided by the constant partial vacuum source at a desired value.

8. Apparatus as defined in claim 1, wherein said variable throttle means includes a buffer reservoir provided with an escape vent, and an electromagnetic valve in said escape vent operable in response to the composition of the burnt gases.

9. Apparatus as defined in claim 8, wherein said reservoir is connected to the partial vacuum from the constant partial vacuum source.

10. Apparatus as defined in claim 8, wherein said reservoir is connected to the partial vacuum in the body of the carburetor.

11. Apparatus as defined in claim 8, wherein the range of the partial vacuum applied to said buffer reservoir is between 0 and 100 gm.

12. Apparatus as defined in claim 4, wherein said second and third membrane capsules are integrally formed into a two-membrane capsule including a pair of membranes and elastic return means for joining said membranes together.

13. Apparatus as defined in claim 8, wherein said second control means includes a probe in the exhaust manifold for delivering electric current varying as a function of the composition of the burnt gases, an electronic circuit coupled to said probe for emitting pulses at constant frequency of recurrence, said pulses having a duration which varies as a function of changes in current from said probe, these variations remaining within two predetermined limits, outside of which said electromagnetic valve will be completely open or closed.

14. Apparatus as defined in claim 1, which includes means for closing said secondary air supply when the engine is running slowly or at full speed.

15. Apparatus as defined in claim 1, which includes an adjustable valve placed in said secondary air supply and adopted to introduce a larger air loss as the partial vacuum rises in the intake manifold.

16. Apparatus as defined in claim 8, wherein the second and third membrane capsules are integrally formed into a two-membrane capsule involving a pair of membranes and elastic return means for joining said membranes together.

* * * * *